M. W. E. DORAN.

Plumb Level.

No. 53,795.

Patented April 10, 1866.

WITNESSES
Wm. Sullivan
John H. Redstone

INVENTOR
Michael W. E. Doran

UNITED STATES PATENT OFFICE.

MICHAEL W. E. DORAN, OF INDIANAPOLIS, INDIANA.

IMPROVEMENT IN PLUMB-LEVELS.

Specification forming part of Letters Patent No. 53,795, dated April 10, 1866.

*To all whom it may concern:*

Be it known that I, MICHAEL W. E. DORAN, of Indianapolis, in the county of Marion and State of Indiana, have invented certain new and useful Improvements in the Construction and Arrangement of the Plumb and Level, or instrument for ascertaining the true angle or position of any plane surface; and I do hereby declare that the following is a full and exact description of the same, reference being had to the accompanying drawings and the letters marked thereon.

Figure 1:
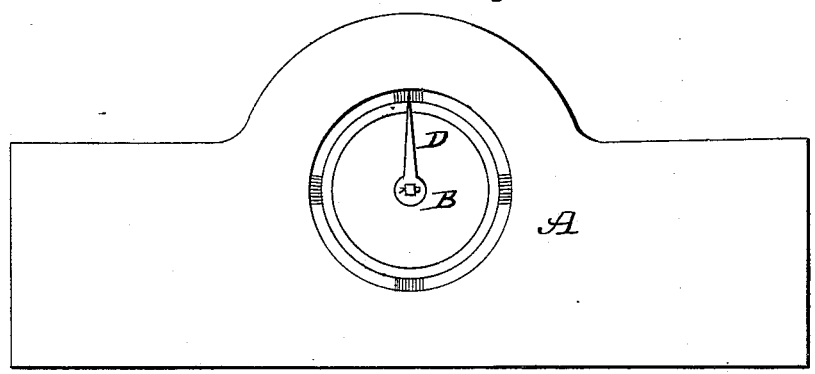
Figure 2:
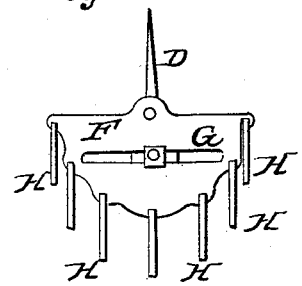
Figure 3:
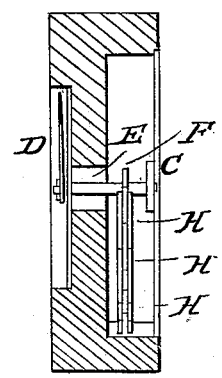

Figure is a front elevation, showing the level complete with the indicator showing a true level. Fig. 2 shows the indicator balance-plate with adjusting slot and device for neutralizing the vibration. Fig. 3 is a section, showing the level cut transversely through the center.

A is the body of the level, and is constructed with the usual straight-edge to lie upon the surface whose angle is to be ascertained.

B is the face-plate, and C the back journal, rest, or brace to support the same. D is the indicator. E is the shaft upon which the indicator D is attached.

F is the plate forming part of the balancer for bringing the indicator to a perpendicular position.

G is the slot for adjusting the weight, so as to cause the indicator to assume a perpendicular to the straight-edge of the level by moving the plate F transversely upon the shaft E.

The pendants, H &c., are attached to the plate F, so as to allow them to vibrate freely.

The following is the operation of the instrument: The plate F being adjusted so that the weight causes the indicator to assume a true perpendicular to the straight-edge when the same is placed horizontally and the marks on the indicator-plate or face-plate corresponding, the instrument is then complete and ready for use, and when placed upon the surface whose angle is to be indicated the plate F and pendants H are set in motion by the sudden movement of the same in placing it; but by the arrangement the vibration of the plate F and the pendants H are made to neutralize each other and it is brought at once to a state of rest. The movement of the instrument imparts the same motion, so far as the length of the different parts will admit, to the plate and the pendants; but the immediate movement of the plate F, swinging in its arc, at once deranges the vibration of the pendants, and is in its turn acted upon. The lower pendants are swung nearly horizontal, while those at the extreme sides are lifted nearly perpendicularly, and the others approximating to either as they approach the bottom or side.

By this arrangement the great difficulty experience in bringing the solid or simple weight to rest is avoided, and though the instrument be used ever so suddenly in placing the same, it is at once brought to rest by the neutralizing effects of the two systems of vibrations; and where the simple weight is used, or the plumb and line, this difficulty never has been overcome, of bringing the indicator to rest quickly.

A straight bar may be used for suspending the pendants by varying the length and consequently the vibrations of the pendants.

What I claim, and desire to secure by Letters Patent, is—

The construction and arrangement of a level or angle indicator by means of the plate F, with slot G, for adjusting the same across the shaft E, and having the pendants H, when operated substantially in the manner and for the purposes set forth.

MICHAEL W. E. DORAN.

Witnesses:
WM. SULLIVAN,
JOHN H. REDSTONE.